Patented Aug. 7, 1928.

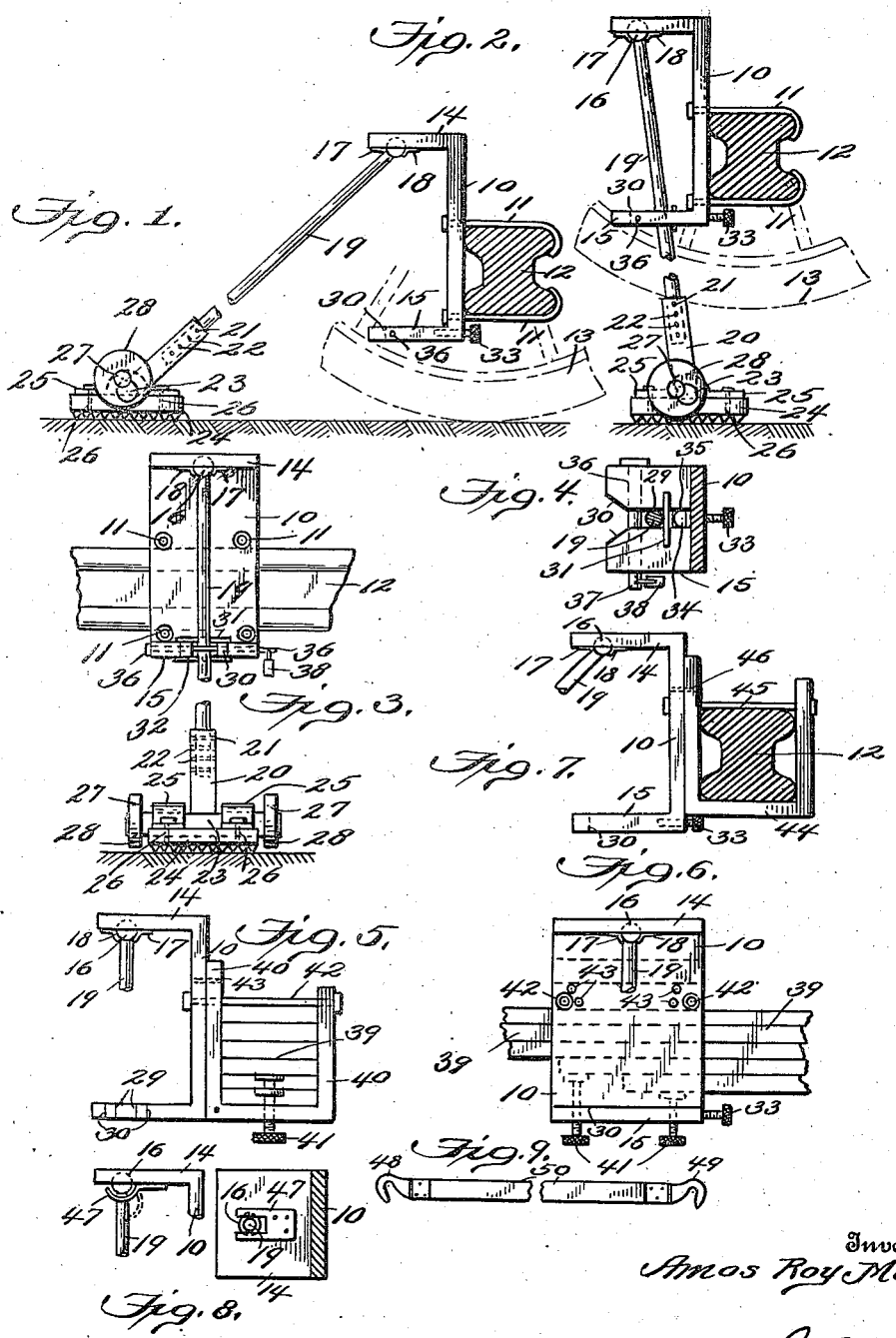

1,680,228

UNITED STATES PATENT OFFICE.

AMOS ROY MARTY, OF ADA, OHIO.

LIFTING JACK.

Application filed April 7, 1927. Serial No. 181,781.

This invention relates to improvements in lifting jacks, one object of the invention being the provision of a jack which is so arranged and positioned relatively to the axle and chassis of an automobile as to impart an elevating or lowering movement to the axle and one wheel thereof due to the movement of the automobile, the supporting structure for the same being adapted to be attached to the axle and to be carried thereby, and in some instances, the jack member itself is to be carried bodily at all times by such supporting member.

Another object of the invention is the provision of a device of this character which is easily placed in position for operating and which, as before stated, may be housed within the automobile or supported out of use against the frame of the chassis, thus providing a device which is always ready to be placed in use in an emergency, as when changing a tire.

In order that the invention may be clearly understood reference will be made to the attached drawings wherein Fig. 1 is an end view showing the jack fitted to a car axle, the jack being foreshortened and in the idle position and ready for use and the car wheel in dotted line and on the ground. Fig. 2 is a like view but showing the wheel and axle in the raised position. Fig. 3 is a rear view of Fig. 2. Fig. 4 is a detail plan view of the jack leg guide of the anchor bracket. Fig. 5 is an end view showing means for securing the anchor bracket to a group of leaf springs. Fig. 6 is a rear view of same. Fig. 7 is an end view showing another or modified means for securing the anchor bracket to the axle. Fig. 8 shows the spring clip ball and socket bearing for holding the head of the jack leg. Fig. 9 shows a brake strap employed for holding the wheel which is being raised.

Referring to Figs. 1 to 4 of said drawings the invention comprises an anchor bracket 10 which by hook bolts or the like as 11 is secured to the car axle 12 carrying the rear wheel 13, although this can also be the front axle and front wheel. This bracket 10 is made with the upper and lower horizontal arms 14 and 15—the upper arm formed with a socket 17—18 to receive the ball shaped head 16 of the jack leg—said head being held in position by plates 17 and 18. This jack leg may be made in one piece or in two sections as 19 and 20 and adapted to telescope with each other and be secured at variable positions by pin 21 passing through one of the adjustment holes 22 formed in said leg sections. The lower section 20 is made with a T shaped terminal 23 fitting in a foot 24 and held by cap plate 25 and bolts or studs 26. The underside of said foot is serrated or corrugated in order to effect a gripping action with the ground. Each terminal 23 at each end is made with an eccentric formation as 27 to thereon receive a roller 28 whose purpose is to relieve said foot in the event of the car being given an excess rear or forward movement when the arm is in the holding position, this action causing the rollers to be forced into engagement with the ground and to act as a fulcrum to raise the foot. The lower arm 15 of the bracket 10 is made with a slot 29 splayed at its mouth 30 in order to provide easy entry of the jack leg 19—20 as seen in Fig. 4. In said slot works a slidable block 31 having side gaps 32 (see Fig. 3) whereby it is operatively held in the slot and adjustable by set screw 33, the latter fitted with plate 34 and between latter and said block 31 operates a spiral spring 35 whose duty is to cushion any shock resultant by the entry of the jack leg into the slot. The lower arm of the bracket 10 is made with a transverse hole to receive a pin 36 which at its terminal is formed with a hole 37 to receive the loop of a padlock 38 in order to lock the jack in its holding position and prevent theft of or unlawful interference with the car.

Referring to the means shown in Figs. 5 and 6 for securing the anchor bracket 10 to a group of leaf springs as 39—said means comprise an intermediate bracket 40 adapted to be seated beneath a group of leaf springs 39 and be held in position by thumb screws 41 which make contact with said springs at varying levels as seen in Figs. 5 and 6. This bracket 40 is secured to the anchor bracket by through bolt or pin 42 engageable with adjustment holes 43 formed therefor in said brackets 10 and 40.

Referring to the alternative means for securing the bracket 10 to the axle 12 in which is employed an intermediate bracket 44 of channel shape and adapted to be seated beneath the axle and by upper through bolt or pin 45 secured to the bracket 10—said bolt or pin engageable with adjustment holes 46 formed therefor in said brackets. The leg of the jack may be raised and by strap or the like fastened beneath the car when not required for use or it may be removed. The leg 19—20 is rendered removable from its socket by spring clips or bearings 47 adapted to open and close by thumb action to allow of the respective entry, retention and withdrawal of said jack head 16 with its socket. Referring to Fig. 9 wherein is shown a strap fitted at each end with a hook as 48—49 whereby it is thereat respectively anchored to the car as say the underside of the running board and to a spoke of either rear wheel 13 which is being raised, the object of said strap is to prevent the rotation of said wheel and to restrict the driving power to the opposite wheel which is on the ground. When a car is equipped with disc wheels the hook 48 is attached to an opening formed therefor in the wheel disc or to a suitable lug attached thereto.

The manner of using the invention is as follows and by way of example in relation to the raising and lowering of a rear wheel of a car. Assume that it is desired to raise such wheel from contact with the ground to effect say change of tyre, the jack leg 19—20 is so placed that it lies at a free angle with the ground as seen in Fig. 1, the strap by its hook 48 being secured to an upper spoke of said wheel 13 in order to prevent its rotation and restrict the driving power to the opposite wheel. The car is now driven rearwardly thus bringing the jack leg to a position slightly beyond the vertical as seen in Fig. 2 and to lie within the slot 29 of the lower arm 15 of the bracket 10 and in such position the jack leg receives the desired amount of strain and weight of the car thus raising the wheel 13 free of the ground. After change of tyre has been effected the car is moved or driven slightly afterward thus releasing the jack leg which may be hung up beneath the car until further required.

What I claim as my invention and desire to secure by Letters Patent is:

1. The combination with the axle and wheel of a vehicle, of a jack, including a support connected to the axle, a swingingly mounted leg connected to the support, a ground-gripping member adjustably connected to the lower end of the leg, whereby the length of the leg may be increased or decreased, a guide for the leg carried by the support, and means for locking the leg in said guide when the leg is in lifting position.

2. The combination with the axle and wheel of a vehicle, of a jack, including a support connected to the axle, a swingingly mounted leg connected to the support, a sleeve adjustably connected to the free end of the leg, a ground-gripping member carried by said sleeve, a guide for the leg carried by the support, and means for locking the leg in said guide when the leg is in lifting position.

3. The combination with the axle and wheel of a vehicle, of a jack, including a support connected to the axle, a swingingly mounted leg carried by the support, a ground-gripping member carried upon the free end of the leg, a guide for the leg carried by the support, means for locking the leg in said guide when the leg is in lifting position, and a resilient buffer mounted in the guide for abutting the leg.

4. The combination with the axle and wheel of a vehicle, of a jack, including a support connected to the axle, a swingingly mounted leg connected to the support, a sleeve adjustably connected to the free end of the leg, a ground-gripping member carried by said sleeve, a guide for the leg carried by the support, means for locking the leg in said guide when the leg is in lifting position, and a resilient buffer mounted in the guide for abutting the leg.

5. The combination with the axle and wheel of a vehicle, of a jack, including a support adapted to be connected to the axle and provided with an upper projecting arm, a leg, a ball and socket joint for detachably connecting said leg to said arm and for universal swinging movement, a spaced guide carried by the support to receive the leg when in lifting position, and means for locking the leg in said guide.

In testimony whereof I have hereunto set my hand.

AMOS ROY MARTY.